UNITED STATES PATENT OFFICE.

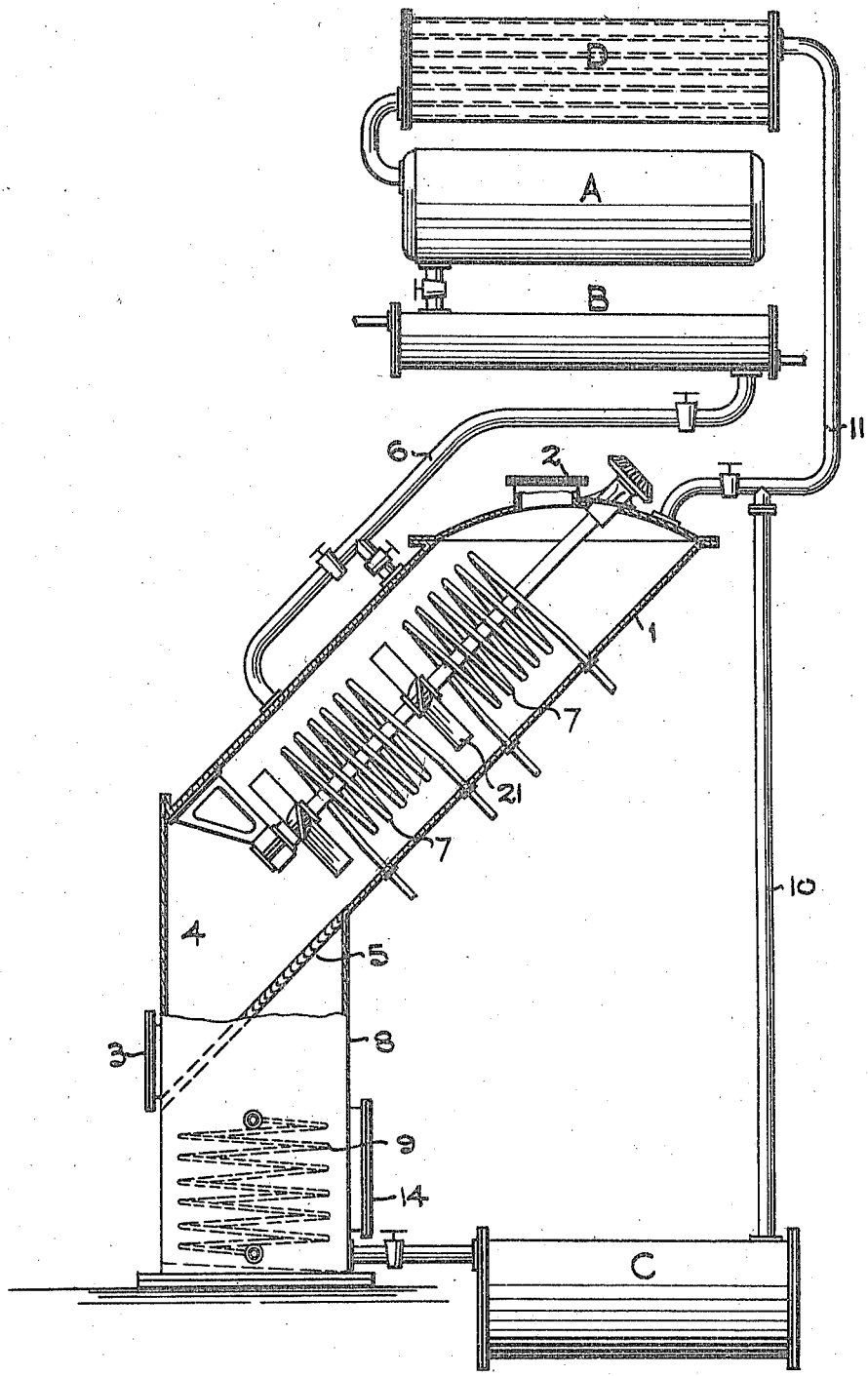

HENRI ENGEL, OF LONDON, ENGLAND.

APPARATUS FOR EXTRACTION OF OILS, FATS AND GREASES, AND OF GELATIN.

1,264,288.

Specification of Letters Patent. Patented Apr. 30, 1918.

Application filed July 3, 1917. Serial No. 178,396.

*To all whom it may concern:*

Be it known that I, HENRI ENGEL, a subject of the Queen of Holland, residing at 32 Shoot-up-Hill, Cricklewood, London, N. W. 2, England, have invented a new and useful Apparatus for Extraction of Oils, Fats and Greases, and of Gelatin, of which the following is a specification.

This invention has relation to apparatus for the extraction of oils, fats and greases, and of gelatin from materials containing or yielding same.

The extraction of oils, fats and greases and of gelatin from materials containing or yielding same is usually effected in an apparatus called an extractor under the influence of heat and the action of spirit, solvents in liquid or vaporous form, water, steam, or other extracting agent.

The invention has for its object to provide an improved construction of extractor from which in practical and everyday use certain advantages shall accrue.

An extractor, in accordance with this invention, comprises a cylindrical or other shaped vessel that is provided with heating means and is inclined in the direction of its length, which dimension is great compared with its transverse or other dimensions. The vessel is provided at its upper and lower ends with means that permit access to be obtained to its interior and the material for treatment to be introduced and the treated material withdrawn at the conclusion of the extraction process. The means mentioned are normally closed. At one part of the vessel and at or toward its lower end and on its under side, it is provided with an opening which is filled with a metal grating or grid of suitable mesh. The vessel is also provided with means for the introduction of extracting agent at one or more places in its length, and, among the material with which it is charged; and is also provided with one or more sets of steam heating coils; the vessel may be fitted, if necessary, with mechanically driven stirrers. Attached to, and forming a downward extension from the lower end of the vessel, is a chamber, which is of such a size that it completely surrounds the grid-filled opening mentioned, and extends downward for some considerable depth. This chamber is provided with steam heating coils and with means which permit access to its interior and the insertion and withdrawal of the steam heating coils. The steam heating coils in the chamber can be removed and inserted without interfering with the interior of the vessel, or without dismantling the vessel.

The chamber described is in connection with a still or stills and the oils, fats or greases or gelatin, together with extracting agent, as they pass from the vessel through the grating or grid into the chamber are led therefrom to the appropriate apparatus. The oils, fats or greases or gelatin may be distilled under the vacuum, if desired, any extracting agent contained therein being removed and returned to the main supply thereof, which is in connection with a condenser or condensers and a heating chamber. The vessel is also in connection with the condenser or condensers by a suitable valve controlled pipe and the pipes connecting the vessel and the still with the condenser or condensers are so arranged and controlled that one or other can be shut down without affecting the other.

An extractor, in accordance with this invention, will now be described with reference to the accompanying sheet of drawings, the figure on which is diagrammatic and illustrative only.

The extractor comprises a cylindrical vessel 1, or a vessel of other shape may be employed so long as its length is great compared with its transverse dimension, as is the case with the vessel 1 illustrated. The vessel 1 is mounted and arranged so as to occupy an inclined position and is provided, at its upper and lower ends, with manholes or other openings 2, 3 adapted to be closed by removable covers. The manholes 2, 3 permit access to be obtained to the interior of the vessel and enable material to be introduced for treatment and withdrawn at the conclusion of the extraction process. Owing to the construction and arrangement of the vessel 1, the charging and discharging will be very much easier than is the case with constructions of extractors now employed. The manholes, 2, 3 are normally closed. The vessel 1 is, at or toward its lower end and on its under side provided or formed with an opening which is filled with a metal grating or grid 5 of a mesh that will permit the passage of the extracted oils, fats or greases or gelatin therethrough into a chamber 8, but will prevent the passage of the material that has been treated or is under treatment into said space. 6 is a pipe in connection, at one end, with a reservoir A either directly or, as shown, through a heater B, and at the other end through one or more branches, two are shown, with the interior of the vessel 1. The heater B is provided for heating up the extracting agent as it passes therethrough on its way to the vessel and so that the vessel 1 is filled with extracting agent at the proper temperature. By means of the pipe 6 the extracting agent can be introduced within the vessel 1 at one or more places in its length and among the material with which the vessel is charged. 7 are coils connected with a steam generator; the steam coils 7 are contained within the vessel 1 and serve to heat up the contained charge of material and to maintain the heat of, or heat up, the extracting agent introduced through pipe 6. The chamber 8 contains steam heating coils 9 and is also provided with a manhole 14 through which access can be obtained to its interior. The chamber 8 is also in connection with a still C (or stills) and, through the still (or stills) with a condenser D (or condensers). The oils, fats or greases or gelatin under the combined actions of heat and the extracting agent are extracted from the charge of material contained in the vessel 1 and pass therefrom through the grating or grid 5 into the chamber 8, wherein they are subjected to further heating action of the steam coils 9. Extracting agent also passes from the vessel 1 into the chamber 8, and this extracting agent, together with the extracted oils, fats or greases or gelatin, are passed by gravity into the still C in which the extracting agent is separated from the oils, fats or greases or gelatin and is led through a pipe 10 to the condenser D in which it is condensed and then delivered to the reservoir A. The still C can be placed otherwise and the oils, fats or greases or gelatin delivered thereto by a pump. The distillation of the oils, fats or greases or gelatin may take place under vacuum, if desired. The vessel may be fitted, if necessary, and as shown, with mechanically driven stirrers 21. The vessel 1 is also connected by a pipe 11, to which the pipe 10 is shown connected with the condenser D so that extracting agent in vaporous form may pass to the condenser D. The pipe 10 may, instead of being connected indirectly with the condenser, be connected directly thereto. The pipes 6, 11 are provided with suitable regulating valves.

I claim:—

1. Apparatus for the extraction of oils, fats, greases or gelatin from materials containing or yielding the same, comprising a vessel inclined in the direction of its length, means for heating said vessel, a chamber communicating directly with said vessel at its lower end and underside, heating means provided in said chamber, a still communicating with said chamber, and a condenser in communication with said still.

2. Apparatus for the extraction of oils, fats, greases or gelatin from materials containing or yielding the same, comprising a vessel inclined in the direction of its length, which dimension is greater than its transverse or other dimensions, a chamber communicating with said vessel at its lower end and underside, a grid disposed between said vessel and chamber, means for heating said vessel and chamber, further means connecting said chamber to a still, condenser and reservoir for the extracting agent, and means for heating the extracting agent passing from said reservoir to the vessel.

In testimony whereof I have signed this specification in the presence of two subscribing witnesses.

HENRI ENGEL.

Witnesses:
FRANK B. DEHU,
A. R. J. RAMSEY.